(12) United States Patent
Chiu et al.

(10) Patent No.: US 7,295,490 B1
(45) Date of Patent: Nov. 13, 2007

(54) SYSTEM AND METHOD OF PHASE ENCODING FOR HIGH FIDELITY VIBRATORY SEISMIC DATA

(75) Inventors: Stephen K. Chiu, Katy, TX (US); Peter M. Eick, Houston, TX (US); Charles W. Emmons, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 11/489,891

(22) Filed: Jul. 20, 2006

(51) Int. Cl.
*G01V 1/28* (2006.01)

(52) U.S. Cl. ............... 367/48; 367/41; 702/17

(58) Field of Classification Search .......... 367/38, 367/41, 48, 189; 181/111; 702/14
See application file for complete search history.

(56) References Cited

U.S. PATENT DOCUMENTS

| | | | |
|---|---|---|---|
| 4,715,020 | A | 12/1987 | Landrum, Jr. |
| 5,550,786 | A | 8/1996 | Allen |
| 5,715,213 | A | 2/1998 | Allen |
| 5,719,821 | A * | 2/1998 | Sallas et al. ............. 367/38 |
| 5,721,710 | A | 2/1998 | Sallas et al. |
| 2007/0091721 | A1* | 4/2007 | Jeffryes ................... 367/41 |

FOREIGN PATENT DOCUMENTS

WO WO 97/18490 5/1997
WO WO 2005/019865 A1 3/2005

OTHER PUBLICATIONS

Bianchi, et al., Six-Fold Simulaneous Vibratory Recording Experiment, May 30, 2002, pp. 1-4, Publisher: EAGE 64th Conference & Exhibition, Florence Italy, Published in: Italy.
Sei-Fi Technology, Apr. 26, 2006, pp. 1-3, Publisher: Veritas Geophysical Integrity Website, Published In: US.
Wilkinson, et al., Seismisc Data Acquisition and Processing Using Measured Motion Signals on Vibrators, 1998, pp. 1-3, Publisher: 1998 SEG Expanded Abstracts, Published in: US.

* cited by examiner

*Primary Examiner*—Ian J. Lobo
(74) *Attorney, Agent, or Firm*—Ryan N. Cross; Terry L. Watt (57) ABSTRACT

In accordance with the present invention, there is provided a method of determining whether a particular high fidelity vibratory seismic survey phase encoding is likely to be a good one based on an analysis of the eigenvalue structure (i.e., eigenvalues, eigenvalue separation, condition number, and model resolution matrix) of a matrix formed from the Fourier transforms of the sweep signals. Preferably, a singular value decomposition will be used to calculate the eigenvalues. Using this same approach, the condition number and eigenvalues of matrices that are associated with multiple proposed designs can be compared with each other to determine which is likely to be yield the best seismic data. This approach is preferably used either as a component of the advanced planning for a survey or in the field during pre-survey testing. The use of the instant approach to determine an optimal phase encoding scheme is also taught.

16 Claims, 6 Drawing Sheets

VIBRATOR SWEEP PHASE
(SCENARIO 2)

| | | | | |
|---|---|---|---|---|
| SWEEP 1 | 90 | 64 | 167 | 283 |
| SWEEP 2 | 64 | 90 | 283 | 167 |
| SWEEP 3 | 167 | 283 | 90 | 64 |
| SWEEP 4 | 283 | 167 | 64 | 90 |

FIGURE 9

SYSTEM AND METHOD OF PHASE ENCODING FOR HIGH FIDELITY VIBRATORY SEISMIC DATA

TECHNICAL FIELD

This invention relates to the general subject of seismic exploration for subsurface hydrocarbons and, in particular, to seismic acquisition and to methods for improving the quality of seismic data.

BACKGROUND OF THE INVENTION

The principal goal of a seismic survey is to image or map the subsurface of the earth by sending energy down into the ground and recording the reflected energy or "echoes" that return from the rock layers below. The source of the down-going sound energy might take many forms but is usually generated by an explosion or seismic vibrators on land, or air guns in marine environments.

During a seismic survey, the energy source is systematically positioned at a variety of locations on or near the surface of the earth above a geological structure of interest. In a typical survey, each time the source is activated it generates a seismic signal that travels downward through the earth, is partially reflected, and, upon its return, is recorded at a great many locations on the surface. The seismic signals are partially reflected from discontinuities of various types in the subsurface (including reflections from "rock layer" boundaries) and the reflected energy is transmitted back to the surface of the earth where it is recorded as a function of travel time.

The sensors that are used to detect the returning seismic energy usually take the form of geophones (land surveys) and hydrophones (marine surveys). In most cases the returning seismic energy is initially sensed as a continuous analog signal which represents amplitude variations as a function of time. The analog signals are thereafter generally quantized and recorded as a function of time using digital electronics so that each data sample may be operated on individually thereafter.

Multiple source activation/recording combinations are subsequently combined to create a near continuous profile of the subsurface that can extend for many miles. In a two-dimensional (2D) seismic survey, the recording locations are generally laid out along a single straight line, whereas in a three dimensional (3D) survey the recording locations are distributed across the surface in a systematic pattern. In simplest terms, a 2D seismic line can be thought of as giving a cross sectional picture (vertical slice) of the earth layers as they exist directly beneath the recording locations. A 3D survey produces a data "cube" or volume that is, at least conceptually, a 3D picture of the subsurface that lies beneath the survey area. In reality, though, both 2D and 3D surveys interrogate some volume of earth lying beneath the area covered by the survey.

As is well known to those of ordinary skill in the art, a land survey typically uses one of two energy sources to generate the down going seismic signal: either an explosive source or a vibrational source. Of particular interest for purposes of the instant disclosure is the use of seismic vibrator. A seismic vibrator generally takes the form of a truck or other vehicle that has a base plate that can be brought into contact with the earth under control of the operator. A reaction mass (which may be on the order of two tons in weight) is driven by a hydraulic jack to produce vibratory motion which travels downward into the earth via the base plate, thereby becoming the source seismic signal. It is common to design a survey that uses multiple vibrators, each being activated simultaneously so that the recording instruments capture a composite signal with contributions from all of them. As was indicated previously, the vibrators (and receiving geophones) are generally moved together across the survey area so that recordings are generated at many different locations and a profile of the subsurface is obtained thereby.

Each excitation of the vibrator is known as a "sweep" (or, sometimes, as a "chirp"). Although many sweep patterns are possible, a common one is the "linear" sweep which is designed to vary between two frequency limits (e.g., between 5 Hz and 150 Hz) over a predetermined period of time. The amplitude of the sweep signal might either be fixed or frequency dependent, depending on a number of factors well known to those of ordinary skill in the art.

One relatively recent advance in the art of vibratory seismic data acquisition involves a technology known as high fidelity vibratory seismic ("HFVS", hereinafter). In the HFVS method, multiple (i.e., two or more) seismic vibrators are operated simultaneously, thereby creating a complex source signal. Typically, a vibrator motion signal will be recorded during each sweep for each vibrator, and the uncorrelated geophone data will similarly be recorded and stored, with the intent of later using the recorded information to process the seismic data and to produce a subsurface image according to methods well known to those of ordinary skill in the art.

In HFVS applications, it is desirable to separate the contributions of each individual vibrator from the recorded composite signal in a multi-vibrator survey. To that end, and is well known to those of ordinary skill in the art, the sweep signals of each vibrator can be varied in such a way as to make later separation feasible. One popular approach to this variation is to use "phase encoding" which, in simplest terms, involves the application of a constant phase shift to each vibrator's signal. That is, each vibrator generates an identical signal but the phase of each is shifted by a predetermined amount with respect to the others. Consider, for example, a scenario wherein there are four vibrators. A particular phase encoding scheme in this scenario might call for the vibrator signals to be shifted, 0, 180, 90, and 90 degrees respectively.

Further, and this is particularly useful in the case of high fidelity surveys (discussed below), often multiple sweeps of the vibrators are conducted at each location. In such a case, it is common to choose a different phase encoding scheme for each sweep. Continuing with the previous example, in a multi-sweep/multi-vibrator survey, the phase encoding for the first sweep at a location might take the form identified above (i.e., phase shifts of 0, 180, 90, and 90 degrees). However, a second sweep at the same location might utilize phase shifts of 0, 90, 180 and 90 degrees respectively.

When it comes time to separate the contribution of each individual vibrator from the composite signal, it is conventional to use an inversion technique which employs either an empirically obtained measure of the source signal (ground force signal) as provided by accelerometers mounted on the vibrator structure to record accelerations of base plate and reaction mass or through the use of a "pilot" signal, a pilot signal being an idealized representation of source energy waveform.

In most cases the multiple vibrators will be positioned relatively close together (e.g., separated by a few meters or tens of meters) and usually follow a pre-designed vibrator-array pattern for the entire survey.

The fidelity of the source separation in connection with the HFVS technology depends to a large degree on the selection of an appropriate vibrator phase-encoding scheme, a good scheme being one that leads to better source separation. Better source separation, in turn, will result in an improved data quality However, as promising as this technology might be, there is currently no satisfactory method for choosing among the potentially infinite number of combinations of sweep phase angles. There is a general feeling in the industry that the vibrators should produce signals that are orthogonal to each other (e.g., separated by a 90 degree phase rotation) but, even assuming that is a design goal, there are still a number of ways that criteria might be implemented with no clear-cut method for choosing between them to ensue that the source separation is as good as possible. Further, if the orthogonality requirement is relaxed and the phase angles of the sweeps are allowed to be non-orthogonal, there is also potentially an infinity of phase encoding schemes to choose from, which means that the problem of selecting the best phase shifts is far too complicated to approach manually.

As a consequence, in some cases a great deal of time and energy may be devoted to determining the best combination of phase angles to use in a particular circumstance. Additionally, in many cases the choice of the relative phase angles is made by viewing raw seismic records which are almost invariably contaminated with noise to the extent that it is difficult to make a clear determination of which approach is best.

Heretofore, as is well known in the seismic processing and seismic interpretation arts, there has been a need for a method of improving the quality and efficiency of acquiring HFVS data. Accordingly, it should now be recognized, as was recognized by the present inventors, that there exists, and has existed for some time, a very real need for a method that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

In accordance with a first embodiment of the present invention, a method of seismic processing, analysis and/or acquisition is disclosed herein that is designed to allow the best phase encoding schemes to be readily determined, schemes that are expected to yield better quality HFVS survey by providing source signals with superior properties than have otherwise been possible.

According to a first preferred embodiment, there is provided a method of selecting between alternative proposed phase encoding schemes so that the scheme that is most likely to yield good data quality can be selected in advance of conducting the survey. In more particular, in the preferred arrangement the eigenvalues of a matrix of Fourier transformed sweep signals are examined to determine whether a particular HFVS survey phase encoding is likely to be a good one. Preferably, a singular value decomposition ("SVD", hereinafter) will be used to calculate the eigenvalues. Based on an analysis of the eigenvalues, condition number, and/or eigenvalue separation of the matrix of Fourier transformed sweep signals, a phase encoding scheme can be evaluated in advance of conducting a survey. To the extent that the foregoing are favorable, that is an indication that the model resolution matrix (as defined hereinafter) is well resolved and, hence, that the proposed phase encoding scheme is likely to be a good one. Further, as an additional and optional test, preferably the fidelity of the source separation in the presence of noise will also be considered and utilized in deciding which scheme to adopt. According to a second preferred embodiment, an optimum or near optimum phase encoding is determined for proposed HFVS survey design. In more particular, according to one preferred embodiment given the number of vibrators and the number of sweep signals, the instant invention numerically determines a phase encoding that yields an optimum condition number for a matrix of Fourier transformed sweep signals. In one preferred embodiment, the optimum phase encoding will be determined by Monte Carlo methods, wherein a large number of phase encodings are randomly selected and the resulting condition number computed for each. The optimum or near optimum phase encoding will be the one that produces the smallest condition number, with the caveat that in some preferred variations the solution will further be constrained by requiring that the eigenvalues of the optimum solution be spaced apart by a predetermined percentage.

The foregoing has outlined in broad terms the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

DETAILED DESCRIPTION

While this invention is susceptible of embodiment in many different forms, there is shown in the drawings, and will be described hereinafter in detail, some specific embodiments of the instant invention. It should be understood, however, that the present disclosure is to be considered an exemplification of the principles of the invention and is not intended to limit the invention to the specific embodiments or algorithms so described.

ENVIRONMENT OF THE INVENTION

Figure 2:
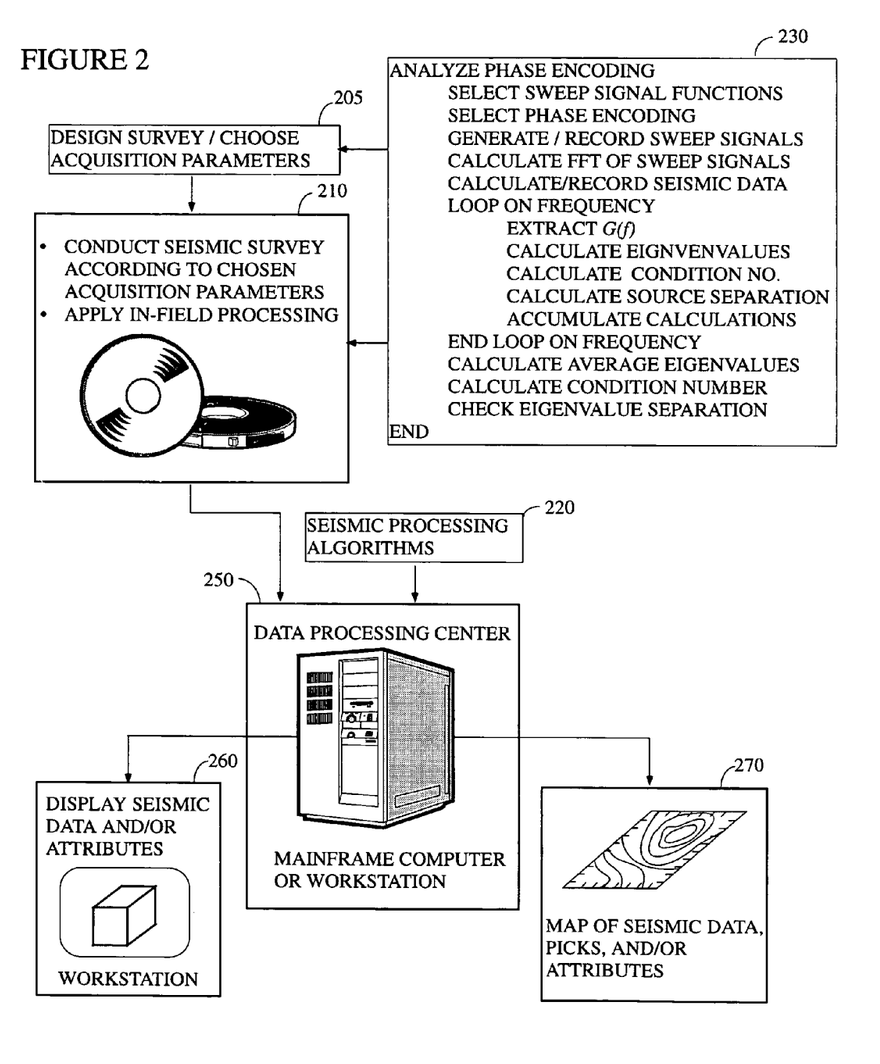
FIG. 2 contains an illustration of a preferred environment in which the invention disclosed herein would typically be used.

FIG. 2 illustrates the general environment in which the instant invention would typically be utilized. In the conventional arrangement, a seismic survey is planned according to methods well known to those of ordinary skill in the art (step 205). As part of the planning, the coverage area will be typically selected and various acquisition parameters will be specified. Among the acquisition parameters that might be specified at this stage include shot and receiver line and station spacing, number of recording channels, near/far receiver offsets, sample rate, etc. Additionally, and in connection with the instant invention, if the survey is to be a HFVS survey, the number of vibrators, the number of repetitions at each shot point, and the phase differentials might be determined based on industry rules of thumb or, more preferably, according to the methods taught herein (step 230). In some preferred embodiments, the methods taught herein will be used in connection with the planning of the survey to help in deciding at least a preliminary phase encoding strategy before reaching the survey site.

As a next preferred step, seismic data are collected in the field (item 210) over a subsurface target of potential economic importance. The data might be collected over land, water, or any combination of these environments. In any case, it is always an object to collect the highest quality raw data (i.e., unprocessed seismic trace data) as is possible, as that can only make the subsequent job of processing and interpretation easier. Methods and procedures for acquiring seismic data in the field are well known to those of ordinary skill in the art. Additionally, in most cases the data will be stored locally as it is collected using, by way of example only, magnetic tape, magnetic disk, CD-R, DVD-R, or other mass storage medium.

In some cases, limited processing of the collected seismic data might be done in the field. This might be done for quality control purposes, for example. If the survey is an HFVS survey and in the context of the instant invention, one preferred embodiment could be utilized in the field to determine—based on actual field records—the phase encoding scheme that will likely produce the highest quality data (step 230).

The collected seismic data 210 (with or without in-field preprocessing) are typically next sent to a data processing center 250 where a variety of seismic data processing algorithms 220 are applied to the seismic traces to make them more amenable to interpretation. The processed traces would then typically be stored, by way of example only, on hard disk, magnetic tape, magneto-optical disk, DVD disk, or other mass storage means, until they are needed by an interpreter.

The methods disclosed herein would best be implemented in the form of a computer program 230 that has been loaded onto a general purpose programmable computer 250 where it is accessible by a seismic interpreter or processor. A general purpose computer 250 includes, in addition to mainframes, workstations and personal computers, computers that provide for parallel and massively parallel computations, wherein the computational load is distributed between two or more processors.

A program 230 embodying the instant invention might be conveyed into the computer that is to execute it by means of, for example, radio based link, a floppy disk, a magnetic disk, a magnetic tape, a magneto-optical disk, an optical disk, a CD-ROM, a DVD disk, a RAM card, flash RAM, a RAM card, a PROM chip, or loaded over a network.

PREFERRED EMBODIMENTS

Turning now to a discussion of the instant invention, according to a first embodiment there is provided a method for determining a good or optimal phase encoding scheme for use with HFVS data. In more particular, the instant invention preferably utilizes the condition number and relative separation of eigenvalues in a particular matrix to determine whether or not a proposed HFVS survey design is likely to be a good one and, in some cases, to determine whether or not the design is optimal. This decision is preferably made by reference to the condition number, eigenvalues, and distribution of the eigenvalues of a matrix to be described hereinafter.

By way of explanation, in a typical HFVS survey two or more (often there will be four) seismic vibrators are operated simultaneously using the same pilot signal, but with each phase of the generator signal used to drive each vibrator being phase shifted by a predetermined constant amount, $\phi$, relative to the others. In such an instance, the data recorded during the survey by geophones or other recording devices, can be represented mathematically according to the standard convolutional model as follows:

$$d_i(t) = \sum_{j=1}^{n} g_{ij}(t) \otimes m_j(t) \text{ for } i = 1, k,$$

where $d_i(t)$ is a column vector that contains the recorded data for sweep i, i=1,k, (i.e., the data trace that resulted from the combined operation of all n vibrators simultaneously during the ith sweep), index j, j=1, n, represents the number of vibrators, $m_j(t)$ is the generally unknown earth reflectivity model at vibrator j, $g_{ij}(t)$ represents the signal generated by vibrator j during sweep i, and represents the convolution operator.

Note that in a preferred configuration, there will be four vibrators and at least a same number of sweeps, so that, the matrix $d_i(t)$ would have k columns and several thousand rows, the length of each row depending on the length of time recorded and the sample rate. For example, if a 27 second recording period is used at a sample rate of 1 ms, $d_i(t)$ would preferably have 27,000 rows, one row for each time sample. Note also that $g_{ij}(t)$ will be dependant on the phase encoding or, more generally, the functional form of the sweep signal that has been selected. Also note that, preferably, there will be more sweeps than vibrators so as to form an over determined system.

Of course, what is ultimately of interest is the earth reflectivity model M at each vibrator $m_j(t)$. That being said, in some circumstances (e.g., when the seismic data $d_i(t)$ are synthetic), the underlying model might actually be known. However, in such circumstance, the steps that follow will still be useful in determining what may be the best phase encoding to use in the field in order to best image the expected structural and stratigraphic subsurface configuration.

Now, let the matrix d be defined as follows:

$$d=[d_1(t)d_2(t)Kd_k(t)],$$

that is d has as its column vectors the observed data from the k different sweeps. Then, let D be the column-wise complex Fourier transform of d, i.e., each column of d has been replaced by its complex Fourier transform matrix D. Of course, those of ordinary skill in the art know that the Fourier transform is one of any number of orthonormal transformations that might be used at this step. For example, Walsh transforms, general wavelet transforms, etc., could be used instead. Further, let the matrix G be the 3-dimensional matrix that is formed from the sweep signals as follows:

$$g = \begin{bmatrix} g_{11}(t) & g_{12}(t) & L & g_{1n}(t) \\ g_{21}(t) & g_{22}(t) & L & g_{2n}(t) \\ M & M & & M \\ g_{k1}(t) & g_{k2}(t) & L & g_{kn}(t) \end{bmatrix},$$

i.e., g is a 3-dimensional matrix that is of dimension (k,n,L), where L is length of each sweep signal.

Let G be the discrete Fourier transform of g, i.e., g has been Fourier transformed in the "L" (i.e., "time") direction. In the frequency domain, the convolutional equation can then be represented in matrix form as:

$$D(f)=G(f)M(f),$$

which expresses the well known interchangeability between time domain convolution and frequency domain multiplication. Note that D(f) is a row vector of D, wherein the row corresponds to samples at Fourier frequency f thus D has dimension (L,k). Similarly, G(f) is an k by n matrix that is created by taking a horizontal slice of G at Fourier frequency f. Finally, the unknown matrix M(f) is column vector of length n (number of vibrators) and represents a frequency slice of the Fourier-transformed reflectivity model data for each vibrator.

As a next preferred step, the generalized least-squares solution for M will be calculated at each frequency f and can be represented in matrix form as:

$$(G^H G)M=G^H D$$

Note that the dependence on the frequency f has been dropped for purposes of notational convenience in the previous equation and hereafter. A preferred way to calculate this least-square solution is to use singular value decomposition ("SVD") to factor G at each frequency:

$$G=USV^H$$

so that the generalized least-squares solution for M is $$M=(G^H G)^{-1}G^H D=VS^{-1}U^H D$$

where U is a matrix of eigenvectors that span the data space, V is a matrix of eigenvectors that span the model space, S is an n by n diagonal matrix whose non-zero elements are called eigenvalues, and H is a conjugate transpose operator. That is, preferably M will be calculated at each frequency according to the previous equation.

Those of ordinary skill in the art will recognize that this equation will yield a unique solution for M only if all of the eigenvalues of G (i.e., the diagonal elements of S) are different from zero. Further, to the extent that one or more eigenvalues of G are "nearly" zero, such will be indicative of the fact that the solution is likely to be underdetermined and/or unstable at that frequency. For purposes of specificity in the text that follows, let the matrix product $VV^H$ be referred to as the model resolution matrix. To the extent that this matrix is equal to (or nearly equal to) the identity matrix, it is anticipated that that selected phase encoding scheme will be a good one.

In view of the foregoing, the instant inventors have determined that a preferred way to evaluate the quality of a proposed phase encoding is to examine the eigenvalues—and the distribution of the eigenvalues—in the Fourier transformed sweep matrix G (or, equivalently, $G^{-1}$). As one suggested rationale for this approach, it should be noted that the all-important subsurface model M cannot be uniquely determined from the sweep signal and recorded data unless the matrix of sweep signals is of full rank, a condition that can be determined by reference to the sweep matrix eigenvalues as is well known to those of ordinary skill in the art.

Thus, according to one preferred aspect of the instant invention, the eigenvalues of G at each frequency in the desired frequency range will be used in the determination of whether or not the proposed combination of sweep functions is likely to yield an acceptable result. Note that, in reality, there are as many matrices/eigenvalue combinations as there are frequencies in the chosen range, which might be zero to Nyquist or some subset thereof. In one preferred embodiment, the collection of eigenvalues will be averaged over all frequencies (or over a range of frequencies that corresponds, e.g., to the range of signal frequencies present in the data) to yield a single set of n eigenvalues that will be used hereinafter to determine the suitability of the proposed sweep combination. Note also that there are methods for directly calculating eigenvalues without calculating an SVD and, as such, computation of the SVD is not strictly necessary, although it is preferred.

As a next preferred step, the condition number of the matrix S will be determined for each frequency in the desired range. As an example, given S at some frequency this computation is readily made by dividing the largest by the smallest nonzero eigenvalue. As was mentioned previously, note that there will potentially be as many condition numbers as there are frequencies and some method of combining them into a single value (e.g., by averaging, taking the median, or other measure of central tendency) is preferred.

Other things being equal, the smaller the condition number the better the proposed phase encoding scheme is likely to be. That being said, in the preferred embodiment the condition number will be used together with other information (discussed below) to find a preferred phase encoding scheme. Of course, those of ordinary skill in the art will recognize that generally speaking the condition number is reflective of the rank of the matrix G at each frequency and, when viewed collectively, broadly representative of the column rank of G.

As a next step, the instant invention preferably determines whether or not the eigenvalue values are distinct, i.e., the numerical distribution of the eigenvalue values is considered. Preferably, the values that are considered at this stage are the average eigenvalue values calculated across each frequency in the selected range. More particularly, the instant inventors have determined that the best HFVS surveys result where the eigenvalue values are separated from each other by a predetermined percentage, e.g., 10%, 20%, etc. That is, a phase encoding scheme that results in distinct and well separated eigenvalues in the G matrix is likely superior to one that that has two or more eigenvalues that are approximately equal. The text that follows illustrates how the foregoing would be implemented in practice.

Although the instant invention might be practiced in many ways, broadly speaking there are two preferred approaches. In a first variation, one or more proposed phase encoding schemes will be examined to determine whether or not a proposed scheme is likely to yield acceptable seismic data and/or which is the best scheme among those proposed. The associated calculations might be done in advance of taking the seismic survey (e.g., in the processing center using synthetically generated data) or in the field as a prelude to (or during acquisition). In a second variation, the instant method is used to determine an optimal or near optimal phase encoding scheme, based on the choice of certain of the survey parameters related to HFVS, e.g., the number of vibrators, sweep function, and number of sweeps, etc., are specified in advance.

Figure 1:
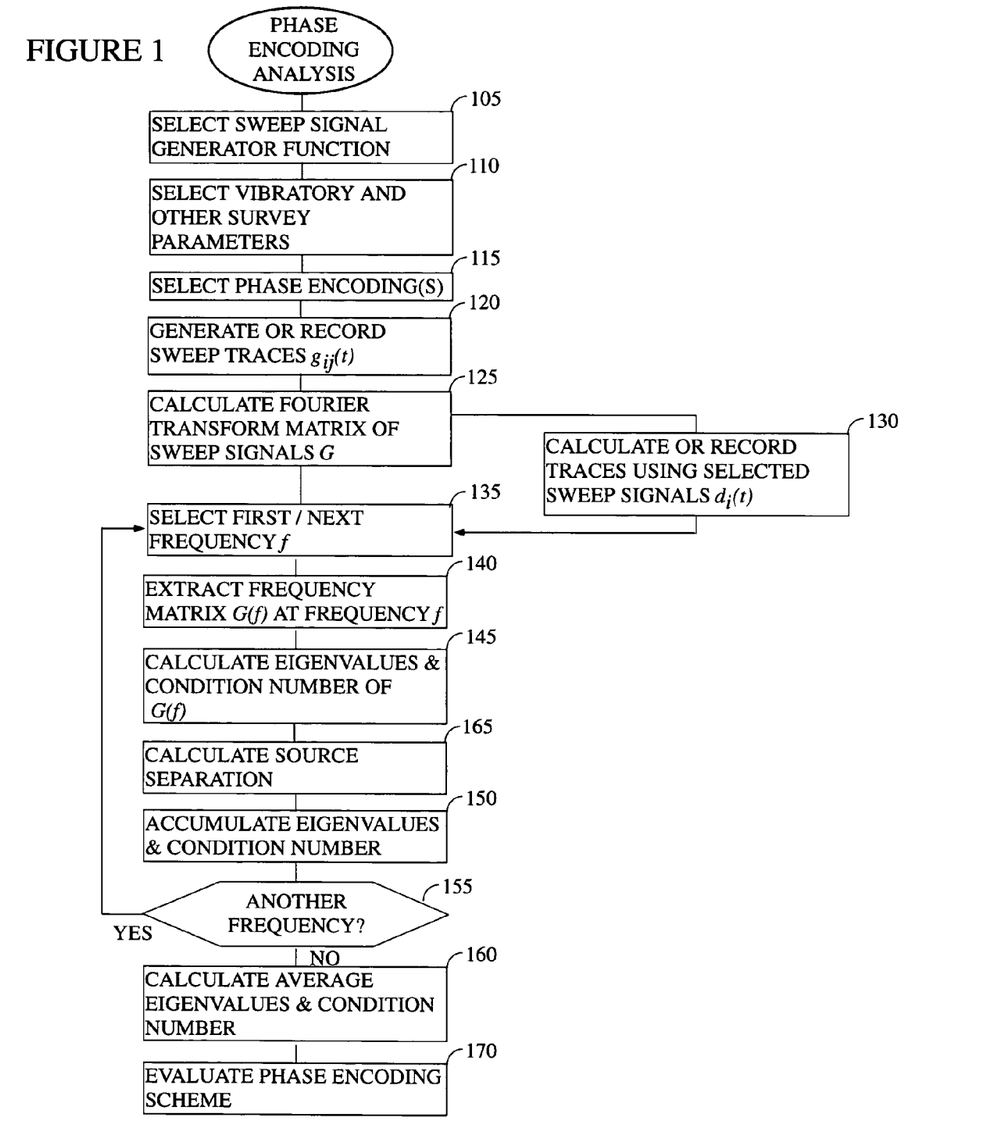
FIG. 1 illustrates some preferred steps in one embodiment of the instant invention.

According to the first variation and as is generally indicated in FIG. 1, according to a first preferred embodiment parameters related to the sweep signal (or pilot signal as it is also known) are specified (step 105). For example, in one preferred arrangement the functional form of the sweep generator function, SW(t), for each vibrator will be chosen to be:

$$SW(t) = A(t)\cos(2\pi\alpha(t) + \phi),$$

where $A(t)$ is the amplitude of the sweep and is preferably constant in time except for tapering at the beginning and end of the sweep, and $\phi$ is a constant phrase rotation angle which in a HFVS survey is typically varied for each vibrator and potentially each sweep. The function $\alpha(t)$ is intended to describe the rate of frequency change in linear sweep and has the preferred general form:

$$\alpha(t) = f_0 t + \frac{(f_1 - f_0)t^2}{2T}$$

where $f_0$ and $f_1$ are the lower and upper frequency limits respectively of the sweep, and T is the sweep length. As a specific example, in some preferred embodiments the sweep range will be from about 8 Hz to 100 Hz with a sweep length of 24 seconds. Note that the above functional form for the sweep signal, as well as the individual parameters associated therewith, is offered for purposes of illustration only and those of ordinary skill in the art will be readily able to adapt the instant invention to alternative parameter choices and alternative sweep signal functional forms.

Next, some basic parameters related to the vibratory survey will preferably be selected (step 110) including, for example, the number of vibrators, number of sweeps, etc. Additionally, it is conventional at this point to select other survey related parameters such as the number of recording traces, the near trace offset, the far trace offset, receiver tracing, the shot (e.g., vibrator position) spacing, etc. The selection of such parameters is well within the capability of one of ordinary skill in the art and will not be discussed further herein.

As a next preferred step, one or more phase encodings will be specified (step 115). Table 1 below provides one phase encoding example wherein there are four vibrators, each of which is to be activated four times (i.e., four sweeps).

TABLE 1

Exemplary Phase Encoding

| | Vibrator 1 | Vibrator 2 | Vibrator 3 | Vibrator 4 |
|---|---|---|---|---|
| Sweep 1 | 90* | 0 | 0 | 0 |
| Sweep 2 | 180 | 90 | 180 | 180 |
| Sweep 3 | 180 | 0 | 90 | 180 |
| Sweep 4 | 180 | 0 | 0 | 90 |

*Phase angle $\phi$ in degrees.

Note that Table 1 gives the relative phase angle for each vibrator during each sweep. Thus, during the second sweep Vibrator 3 will have a phase shift of 180 degrees. Note also that it is preferred that during each sweep all four vibrators will operate simultaneously.

As a next preferred step, seismic data will be generated or recorded using the specified phase encoding scheme (step 120). This step is intended to broadly encompass the two most likely usage scenarios: in-field testing and survey planning. That is, in the event that the phase encoding is to be evaluated during an in-field experiment, the vibrators will be swept according to the proposed phase encoding scheme and the resulting data will be recorded for subsequent analysis.

On the other hand, if the instant method is being used to develop a survey plan, the data will preferably be generated using the sweep generator function and phase encoding scheme specified previously in combination with a 1D, 2D, or 3D subsurface geologic models according to methods well known to those of ordinary skill in the art (e.g., ray tracing of the model and convolution of the resulting reflectivity series with the appropriate phrase encoded sweep generator functions).

As a next preferred step, the discrete Fourier transform of the recorded or generated data will be computed (step 125) according to methods well known to those of ordinary skill in the art Next, the data traces $d_i(t)$ will preferably be generated or recorded using the sweep signals and phase encoding specified previously (step 130). Note that this step (the step of finding the best phase encoding scheme) is optional if a synthetic (e.g., pre-survey) analysis is being performed. However, if phase encoding is being selected in the field it is customary to run the vibrators according to the selected encoding and then visually and/or analytically evaluate the data recorded therefrom or use this approach to analyze the uniqueness of the source separation. Of course, one preferred way of mathematically generating the $d_i(t)$ would be to convolve each vibrator signal with its corresponding source reflectivity model and then sum the results to form the composite data trace.

As a next preferred step, the instant invention enters a loop over the designated frequency range (steps 135 through 155, inclusive). Within this loop, the matrix G(f) will preferably be extracted at the appropriate frequency (step 140), and its eignvalues determined (step 145). The calculated values will then preferably be accumulated (step 150) and another frequency processed (decisions item 155) if the current frequency is not the last one.

As a next optional step 165, the recorded seismic data (or generated data if synthetic are being used) will be subjected to a mathematical process designed to recover the unique contribution of each vibrator from the signal $d_i(t)$. This step is commonly referred to in the art as "source separation." Means for doing this are well known and, thus, need not be discussed here. That being said, it should be noted that the instant inventors have determined that better source separation results when the phase encoding scheme is selected according to the methods discussed herein than would otherwise be expected.

After the appropriate frequency range has been processed (the "NO" branch of decision item 155), preferably an average (or median, mode, trimmed mean, etc.) or other composite measure of the eigenvalues will be calculated from the values obtained in step 145. Note that there will generally be as many eigenvalues are there are source signals. Similarly, an average or composite condition number of the G(f) matrices will be calculated.

Finally, an examination of the eigenvalues and condition number of the proposed survey design will be used to determine whether or not the proposed phase encoding scheme is likely to be a good one (step 170). Note that, if such is available, the source separated seismic data may also be consulted during this phase.

According to another preferred embodiment, there is provided an invention substantially similar to that discussed above, but wherein an optimal or near optimal phase encoding scheme is determined. Generally speaking, the instant embodiment preferably takes the form of a Monte Carlo simulation that uses a large number of sweep signal generator function suites, each suite being characterized by chosen parameter values. For example, with respect to phase encoding, the parameter that is randomly selected is the relative phase between vibrators, i.e., the phase encoding. Then, a best suite of generator functions will be selected from among those randomly chosen according to the criteria set out previously. The chosen suite will then likely be optimal—or near optimal—under the constraints of the simulation and will likely yield the best HVFS survey.

Figure 3:
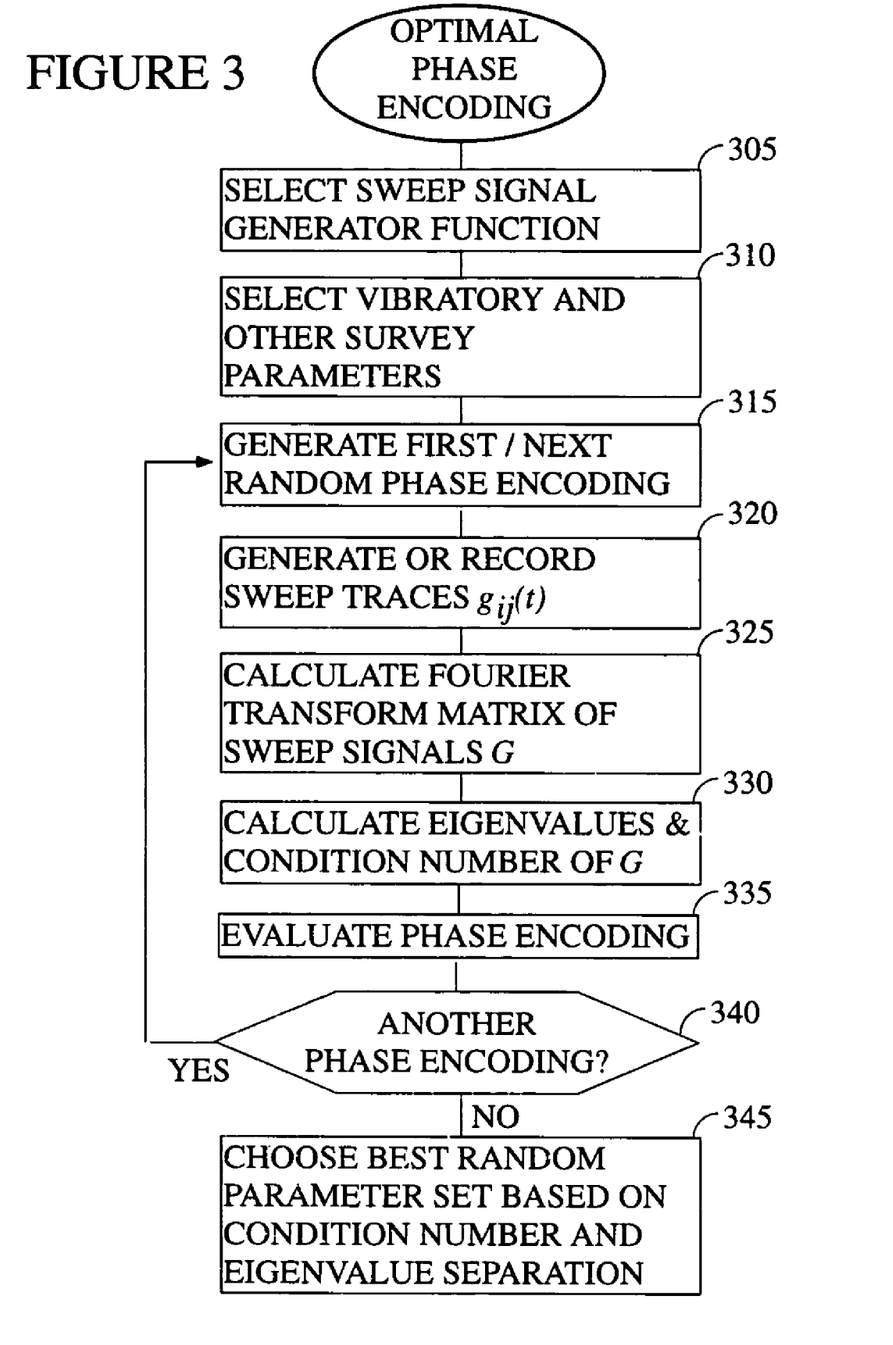
FIG. 3 contains a flowchart that illustrates some preferred steps in the determination of an optimal phase encoding scheme FIG. 4 contains a schematic representation of how a HFVS survey might be conducted in the field.

Turning to a discussion of the instant embodiment in greater detail, as is generally indicated in FIG. 3 and has previously been discussed in connection with FIG. 1, as a first preferred step a functional form (or forms) of the sweep signal generator will be selected (step 305) and the vibratory and other survey parameters will preferably also be specified (step 310).

As a next preferred step, a random parameter matrix will be generated (step 315). If the selected functional forms of the sweep generator function are all the same and the parameter that is to be varied is the relative vibrator phase, then each random matrix will have an appearance similar to that of the values in Table 1 supra (assuming four vibrators and four sweeps). However, and more generally, the parameters that are to be optimized over could be virtually any combination of quantities that control the source signal. For example, one parameter might be the rate of frequency change a(t) discussed previously (or as a related choice, the maximum and/or minimum sweep frequency). Those of ordinary skill in the art will recognize that all that is necessary is that the parameter that is randomly selected somehow be capable of modifying the sweep signal.

As a next preferred step 320, sweep signals will be generated according to the random parameter choices. Although, obviously, this method could be applied in the field, it is best suited for use during survey preparation when fairly substantial computer power is more likely to be available. Thus, it is anticipated that usually the sweep traces $g_{ij}(t)$ will be generated synthetically, but they could also be recorded in the field.

As a next preferred step, the matrix of Fourier transformed sweep signals G will be generated (step 325) and the eigenvalues and condition number at each frequency G(f) will preferably be calculated as before (step 330).

As a next preferred step the current random parameter selections will be evaluated, preferably by using the composite eigenvalues and condition number as obtained from the matrix G. Then, the previous process repeats by returning to step 315 (random parameter selection) via the "YES" arm of decision item 340.

Finally, after the requisite number of random parameter selections have been processed (and/or if some other convergence criterion has been achieved) the best of the previously parameter sets will be selected as the optimum one (step 345). As might be expected, the optimum choice will preferably be the parameter set that produces the best condition number and which has an appropriate eigenvalue separation.

Figure 4:
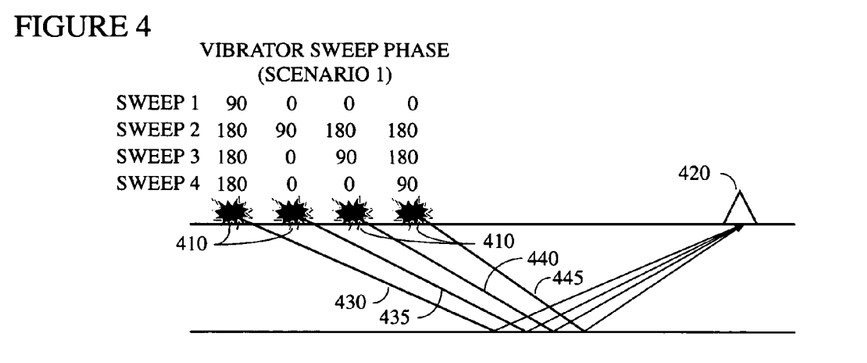

Finally, FIGS. 4 through 10 are designed to illustrate how the instant method works in practice. FIG. 4 contains a schematic illustration of a four-vibrator experiment using sources 410. Remote receiver 420 is for receiving the upwardly reflected energy from the sources 410 via the representative ray paths 430, 435, 440, and 445. As is indicated in this figure, four sweeps are planned with the phase encoding scheme indicated.

Figure 5:
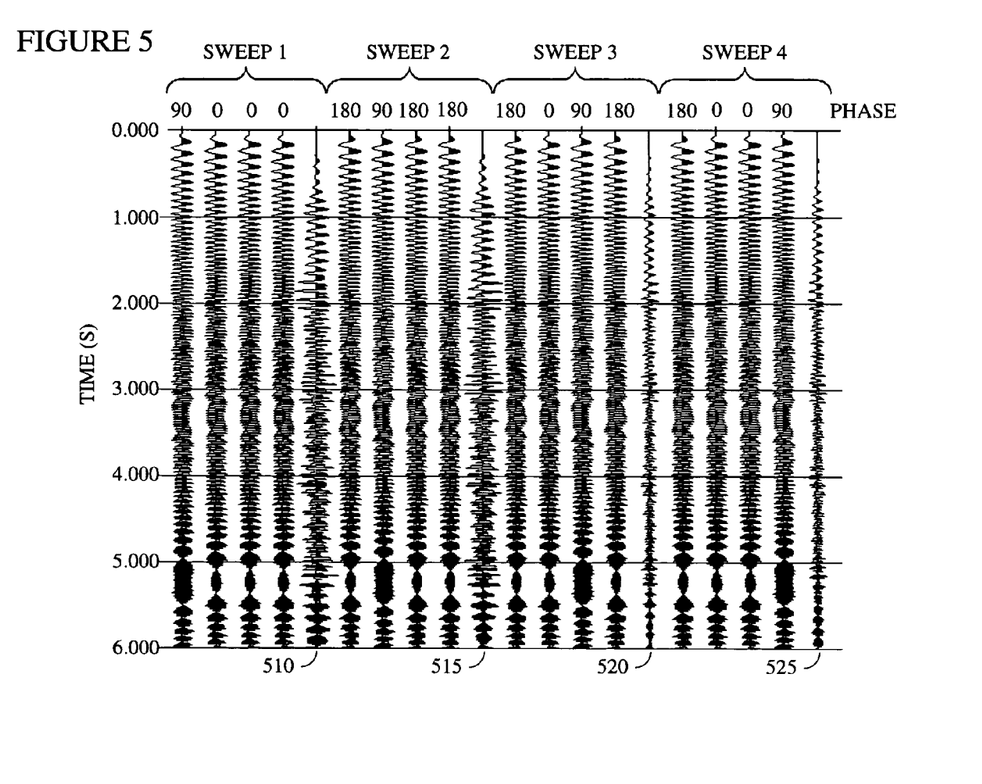
FIG. 5 illustrates a synthetic data set generated according to the phase encoding scheme of FIG. 4.

FIG. 5 contains synthetic seismic data that has been generated according to the phase encoding scenario of FIG. 4. For example, the first four traces under the heading "SWEEP 1" correspond to the four sources, each operating at the designated phase. The fifth trace associated with each sweep (traces 510, 515, 520, and 525) contains the data that was actually "recorded" at the receiver 420. Of course, since these traces are synthetic there is no actual recording trace at the receiver 420 but instead a mathematical representation of the expected recording—given an assumed subsurface reflectivity model—is presented. Finally, note that in conducting this simulation a data length of 27 seconds was used with a sweep of 24 seconds. The frequency range was chosen to be 8 to 100 Hz and the subsurface was assumed to consist of flat layers of uniform thickness.

Figure 7:
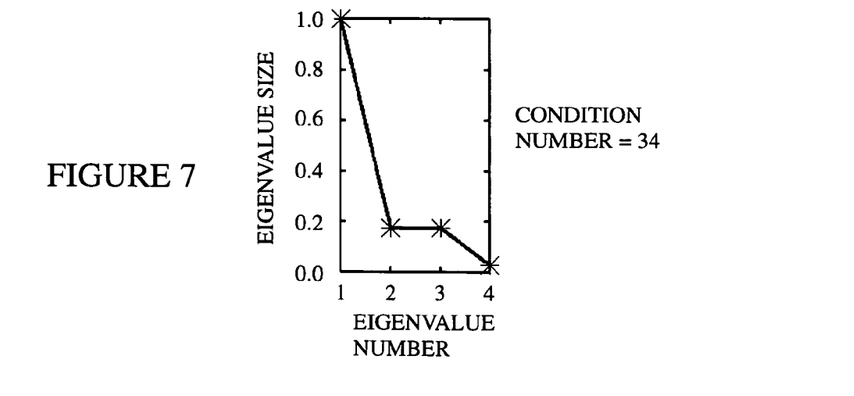
FIG. 7 illustrates the distribution of eigenvalues and the condition number for phase encoding scheme of FIG. 5.

FIG. 7 illustrates the condition and eigenvalue distribution for the phase encoding scheme of FIG. 4. Note that the condition number is 34 and eigenvalues 2 and 3 are approximately the same size. The fact that the two eigenvalues have approximately the same values implies that the source separations are not likely to be satisfactory. Based on this analysis, one would expect the chosen phase encoding to do a relatively poor job.

Figure 6:
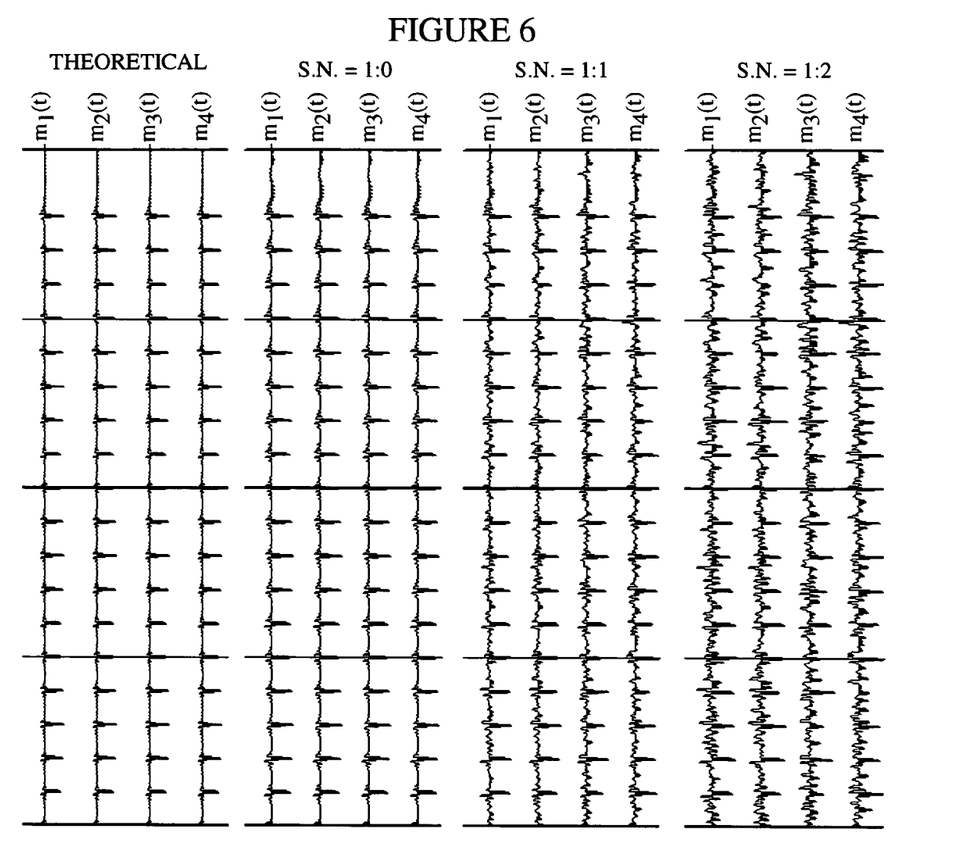
FIG. 6 illustrates the results of solving the synthetic data presented in FIG. 5 for the four vibrator reflectivity models ($m_1(t)$ through $m_4(t)$) under various amounts of noise contamination.

FIG. 6 confirms that notion. In this figure, an attempt is made to calculate each of the vibrator reflectivity models from the synthetic data. Further, and in an attempt to add some degree of realism to this experiment, various amounts of random noise were added to the seismic traces. As can be seen, in the noise-free case the instant method produces a very good representation of the subsurface model (i.e., the "Theoretical" model). However, as noise is added the solution becomes increasing poor and eventually becomes almost useless (e.g., at a signal-to-noise level of 1:2, rightmost four-trace panel).

Note also that the model resolution matrix (Table 2 below) is very far from a diagonal matrix, although it is diagonally dominant:

TABLE 2

Model Resolution Matrix (Scenario 1)

| 0.75 | 0.25 | 0.25 | 0.25 |
|------|------|------|------|
| 0.25 | 0.75 | 0.25 | 0.25 |
| 0.25 | 0.25 | 0.75 | 0.25 |
| 0.25 | 0.25 | 0.25 | 0.75 |

Based on the analysis methods discussed previously, one would expect the phase encoding scheme of FIG. 5 to be suspect and, indeed, only in the absence of noise does this model produce a very good result.

Figure 8:
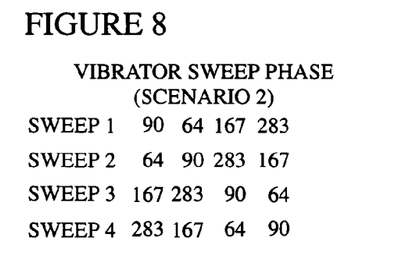
FIG. 8 contains an alternative phase encoding scheme for use with a four vibrator model.

Compare the results from the previous example with those obtained via the phase encoding scheme of FIG. 8. As can be readily seen by reference to FIG. 10, the condition number of this matrix is much better (i.e., the condition number is 6 as compared with 34 previously) and, other things being equal, a better result would be expected.

Figure 9:
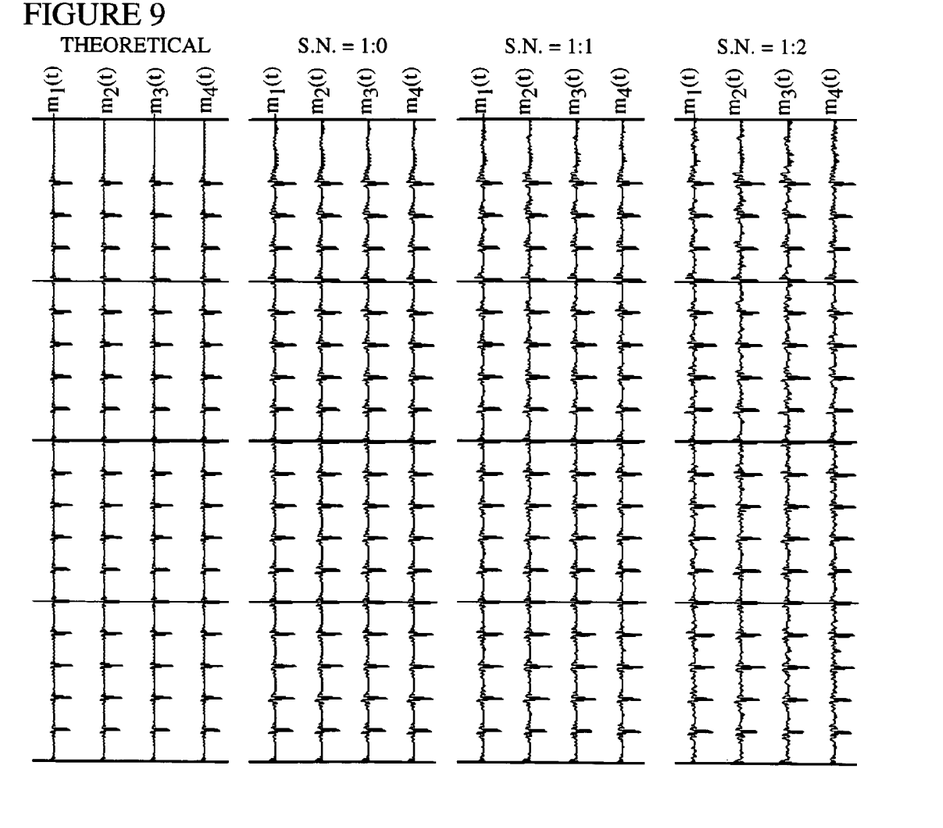
FIG. 9 illustrates the results of solving the synthetic data of scenario 2 for the four vibrator reflectivity models ($m_1(t)$ through $m_4(t)$) under various amounts of noise contamination.
Figure 10:
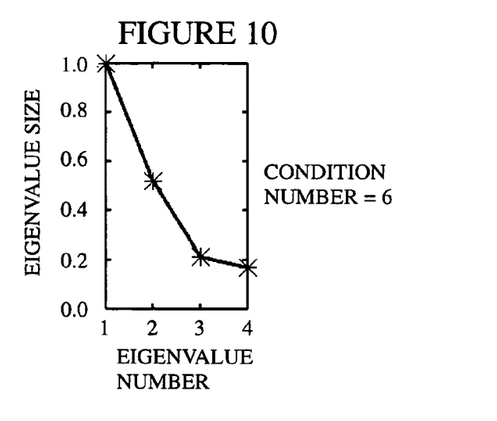
FIG. 10 illustrates the distribution of eigenvalues and the condition number for phase encoding scheme of FIG. 9.

FIG. 9 contains a solution for the vibrator reflectivity models under the same noise conditions as were used in the previous example. As can readily be seen, even at very high noise levels the recovered reflectivity is clearly a good representation of the actual subsurface model. Once again, based on the condition number and separation of eigenvalues a better result was expected and, indeed, the resulting survey was much less sensitive to contaminating noise than was the previous example. By way of comparison, the model resolution matrix for this phase encoding scenario (Scenario 2) is as follows in Table 3:

TABLE 3

Model Resolution Matrix (Scenario 2)

| 1.0 | 0   | 0   | 0   |
|-----|-----|-----|-----|
| 0   | 1.0 | 0   | 0   |
| 0   | 0   | 1.0 | 0   |
| 0   | 0   | 0   | 1.0 |

CONCLUSIONS

In the previous discussion the language has been expressed in terms of operations performed on conventional vibratory seismic data for use in exploration for hydrocarbons. But, it is understood by those skilled in the art that the invention herein described could be applied advantageously in other subject matter areas, and used to locate other subsurface minerals besides hydrocarbons, e.g., coal. By way of additional examples, although it is preferred that the receivers of the instant invention be located on the surface of the earth that is not a requirement. For example, the instant invention would be suitable for use in a VSP survey or other survey where the receivers are below the ground or under water. Additionally, the instant invention would also be suitable for use in a marine environment if marine vibrators were to be used.

Further, it should be noted that the instant invention is suitable for use with pilot signals, sweep signals, or other theoretical or recorded representation of the vibrator signal. As a consequence, when these terms are used in the claims that follow, each should be broadly interpreted to include the other as well as other/similar traces representative of the actual or intended vibrator signal pattern.

Still further, although the instant invention is well suited for use in determining the best phase encoding scheme, this approach potentially has much broader applicability. For example, there is no requirement that the vibrator sweep signals be limited to be phase shifted versions of each other in order to calculate the eigenvalues, their separation, the condition number, etc., of the matrix of Fourier transformed sweep signals. As a consequence, the instant inventors have determined that it is possible to use the instant method to choose among proposed sweep signal combinations which are not just simple phase shifted versions of each other but, instead, might be very different sorts of signals. For example, the instant method could be used to determine whether a four vibrator combination that uses a linear sweep up signal, a linear sweep down signal, a logarithmic sweep up, and a logarithmic sweep down would likely be a good choice. In other instances, the instant method could readily be used to compare different sweep frequency ranges (e.g., a four vibrator survey wherein sweep frequency ranges of 5 Hz to 150 Hz, 15 Hz to 125 Hz, etc. are being considered and compared). As a consequence, when the phrase "vibratory survey design" is used herein that phrase should be broadly construed to include any scenario wherein a predetermined collection of sweep functions are utilized in multiple vibrator sweeps according to a predetermined pattern.

Further to the previous point, it should also be noted that the embodiment of the instant invention that seeks to determine an optimal or near optimal phase encoding is broadly applicable to other kinds of sweep functions and parameters thereof. That is, the preferred Monte Carlo approach randomly selects phase angles for use with a plurality of sweep generator functions, all of which are typically taken to have the same functional form (i.e., the only difference between the sweep signals used by vibrators/sweeps is the phase shift). However, obviously the same approach could be used with sweep generator functions that are different in functional form and have completely parameter sets, the principal difference being that random values of each generator function's characterizing parameters would be chosen, for example, at step 315 of FIG. 3. As such, the instant invention is well adapted to determining an optimal or near optimal combination of arbitrary sweep function generators/parameter choices.

Additionally, and for purposes of clarity, when the phrase "suite of sweep signals" is used herein, that term should be broadly understood to be a same number of vibrators executing in unison for a predetermined number of different sweeps. For example, if n vibrators operate in unison during k different sweeps, the suite of sweep signals would be comprised of k*n sweep signals. Further, each vibrator will utilize a sweep signal that is potentially different from that used by any of the other vibrators. That being said, there is no requirement that each vibrator utilize a unique sweep signal and, instead, all that is required is that the suite of sweep signals result in a good seismic data set.

Finally, a central facet of the instant invention is that the quality of a suite of sweep signals may be determined by examination of the eigenvalues of a matrix formed therefrom. However, those of ordinary skill in the art will recognize that it is not required that the values actually be formed into a k by n matrix in order to determine its eigenvalues. It is quite possible that the eigenvalues will be calculated from numerical values that are stored row-wise, column-wise, or otherwise in a linear (or other) array. Thus, when the it is said that an eigenvalue is calculated from a collection of numbers, it should be understood that this language does not require that the numerical values be literally arranged into an appropriately sized matrix, but only that the appropriate numerical calculation be made.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of evaluating a suite of vibrator sweep signals for use in a vibratory seismic survey, wherein said suite of vibrator sweep signals is for use with a predetermined number of sweeps and a predetermined number of vibrators, wherein said predetermined number of sweeps is greater than or equal to said predetermined number of vibrators, comprising the steps of:
   a. calculating a Fourier transform of each of said vibrator suite sweep signals in said suite of vibrator sweep signals, thereby producing a plurality of Fourier transformed sweep signals;
   b. selecting at least one frequency;
   c. for each of said plurality of Fourier transformed sweep signals, identifying a numerical value corresponding to said selected at least one frequency, thereby obtaining a same number of identified numerical values as Fourier transformed sweep signals;
   d. calculating at least a largest and a smallest eigenvalue using at least said identified numerical values; and,
   e. using at least said largest and said smallest eigenvalues to evaluate said suite of vibrator sweep signals.

2. A method of evaluating a suite of vibrator sweep signals for use in a vibratory seismic survey according to claim 1, wherein step (e) comprises the step of:
   (e1) performing at least steps (b) through (d) a plurality of times for at least two different frequencies, thereby producing at least two different largest eigenvalues and at least two different smallest eigenvalues,
   (e2) combining said at least two largest eigenvalues into a single representative largest value,
   (e3) combining said at least two smallest eigenvalues into a single representative smallest value,
   (e4) using at least said representative largest value and said representative smallest value to evaluate said suite of vibrator sweep signals.

3. A method of evaluating a suite of vibrator sweep signals for use in a vibratory seismic survey according to claim 2, wherein step (e2) comprises the step of:
   (i) calculating an average of said at least two largest eigenvalues, wherein step (e3) comprises the step of:
   (ii) calculating an average of said at least two smallest eigenvalues, and,
   wherein step (4) comprises the step of:
   (iii) using at least said average largest value and said average smallest value to evaluate said suite of vibrator sweep signals.

4. A method of evaluating a suite of vibrator sweep signals for use in a vibratory seismic survey according to claim 1, further comprising the step of:
   f. positioning said vibrators proximate to a predetermined location on the surface of the earth; and,
   g. energizing said predetermined number of vibrators according to said suite of vibrator sweep signals for said predetermined number of sweeps, thereby vibrating the earth to produce a seismic signal for interrogating the subsurface of the earth therebeneath.

5. A method of evaluating a suite of vibrator sweep signals for use in a vibratory seismic survey according to claim 4, wherein said seismic vibrators are positioned on land proximate to said predetermined location.

6. A method of evaluating a suite of vibrator sweep signals for use in a vibratory seismic survey according to claim 1, wherein step (e) comprises the steps of:
   (e1) calculating a condition number from said largest and said smallest eigenvalues, and,
   (e2) using at least said condition number to evaluate said suite of vibrator sweep signals.

7. A method of evaluating a suite of vibrator sweep signals for use in a vibratory seismic survey according to claim 1, wherein step (d) comprises the step of:
   (d1) calculating at least three eigenvalues from said identified numerical values, said at least three eigenvalues having a largest and a smallest eigenvalue, and,
   wherein step (e) comprises the steps of:
   (e1) determining a value representative of an amount of numerical separation between said at least three eigenvalues, and,
   (e2) using at least said value representative of said amount of numerical separation between said at least three eigenvalues and said largest and smallest eigenvalues to evaluate said suite of vibrator sweep signals.

8. A method of evaluating a suite of vibrator sweep signals for use in a vibratory seismic survey according to claim 1, wherein step (d) comprises the steps of:
   (d1) forming said identified numerical values into a matrix, and,
   (d2) calculating at least a largest and a smallest eigenvalue from said matrix.

9. A method of determining a near-optimal suite of sweep signals for use in a vibratory seismic survey, wherein said suite of sweep signals is for use with a predetermined number of vibrators each executing a predetermined number of sweeps in unison, wherein said predetermined number of sweeps is greater than or equal to said predetermined number of vibrators, comprising the steps of:
   a. selecting at least one sweep generator function, each of said at least one sweep generator function has at least one unknown parameter associated therewith;
   b. associating each vibrator sweep signal in said suite of vibrator sweep signals with one of said selected sweep generator functions;
   c. choosing a value of each of said at least one unknown parameters for each of said associated sweep generator function;
   d. generating a suit of trial sweep generator signals from each of said associated sweep generator functions according to said values of said unknown parameters;
   e. calculating a Fourier transform of each of said trial sweep generator signals, thereby producing a corresponding suite of Fourier transformed trial sweep signals;
   f. selecting at least one frequency;
   g. for each of said suite of Fourier transformed trial sweep signals, identifying a numerical value corresponding to said selected at least one frequency, thereby obtaining a same number of identified numerical values;
   h. calculating at least one value representative of a largest and a smallest eigenvalue from said identified numerical values;
   i. performing steps (c) through (h) at least twice for at least two different choices of values of said unknown parameters, thereby producing a plurality of values representative of each of said largest and said smallest eigenvalues calculated in step (h); and, j. choosing as said near-optimal suite of vibrator sweep signals said suite of trail sweep signals associated with a particular one of said values representative of each of said largest and said smallest eigenvalues.

10. A method of determining a near-optimal suite of sweep signals for use in a vibratory seismic survey according to claim 9, wherein all of said selected at least one sweep generator functional forms are a same functional form.

11. A method of determining a near-optimal suite of sweep signals for use in a vibratory seismic survey according to claim 10, wherein all of said sweep generator functional forms are defined according to the equation:

$$SW(t) = A(t)\cos(2\pi\alpha(t) + \phi),$$

where SW(t) is said sweep generator function, t is time, A(t) is an amplitude of a sweep, $\phi$ is an unknown parameter that represents an amount of a phase rotation, and $\alpha(t)$ is a function that describes a rate of frequency change as a function of time.

12. A method of determining a near-optimal suite of sweep signals for use in a vibratory seismic survey according to claim 9, wherein step (c) comprises the step of:
(c1) randomly choosing a value of each of said unknown parameters for each of said associated sweep generator functions.

13. A method of determining a near-optimal suite of sweep signals for use in a vibratory seismic survey according to claim 9, wherein step (c) comprises the step of:
(c1) randomly choosing a value of each of said unknown parameters for each of said associated sweep generator functions.

14. A method of determining a near-optimal suite of sweep signals for use in a vibratory seismic survey according to claim 9, wherein step (h) comprises the steps of:
(h1) calculating a largest and a smallest eigenvalue from said identified numerical values,
(h2) calculating a determinant from said largest and said smallest eigenvalues, said determinant, said largest eigenvalue, and said smallest eigenvalue together comprising at least one value representative of said largest and said smallest eigenvalue.

15. A method of determining a near-optimal suite of sweep signals for use in a vibratory seismic survey according to claim 9, comprising the further step of:
k. conducting a vibratory seismic survey over a portion of the earth containing an exploration target according to said chosen suite of vibrator sweep signals, said vibratory seismic survey utilizing said predetermined number of vibrators and said predetermined number of sweeps.

16. A method of determining a near-optimal suite of sweep signals for use in a vibratory seismic survey according to claim 9, wherein step (h) comprises the steps of:
(h1) forming said identified numerical values into a matrix, and,
(h2) calculating at least one value representative of a largest and a smallest eigenvalue from said matrix.

* * * * *